Nov. 2, 1948.  E. G. BODEN  2,452,719

BEARING LUBRICATION

Filed Feb. 12, 1945

INVENTOR:
Ernest G. Boden,
by Carr, Kent & Grandy
HIS ATTORNEYS.

Patented Nov. 2, 1948

2,452,719

UNITED STATES PATENT OFFICE 2,452,719

BEARING LUBRICATION

Ernest G. Boden, Canton, Ohio, assignor to The Timken Roller Bearing Company, Canton, Ohio, a corporation of Ohio Application February 12, 1945, Serial No. 577,525

8 Claims. (Cl. 308—187)

This invention relates to the lubrication of bearings for rotary shafts, particularly lubricating devices of the kind including a slinger which rotates with the shaft and acts centrifugally to supply lubricant to the bearing therefor from a reservoir therebeneath. A practical objection to such devices is that the lubricant is fed too freely to the bearing, thus lowering the efficiency thereof and causing damage thereto by overheating. The principal object of the present invention is to devise a lubricating device of the above type that will overcome the objections hereinbefore pointed out by providing a relatively slow feed of lubricant to the bearing. Other objects are simplicity and economy of construction and compactness of design. The invention consists in the lubricating device and in the parts and combinations and arrangements of parts hereinafter described and claimed.

Figure 1:
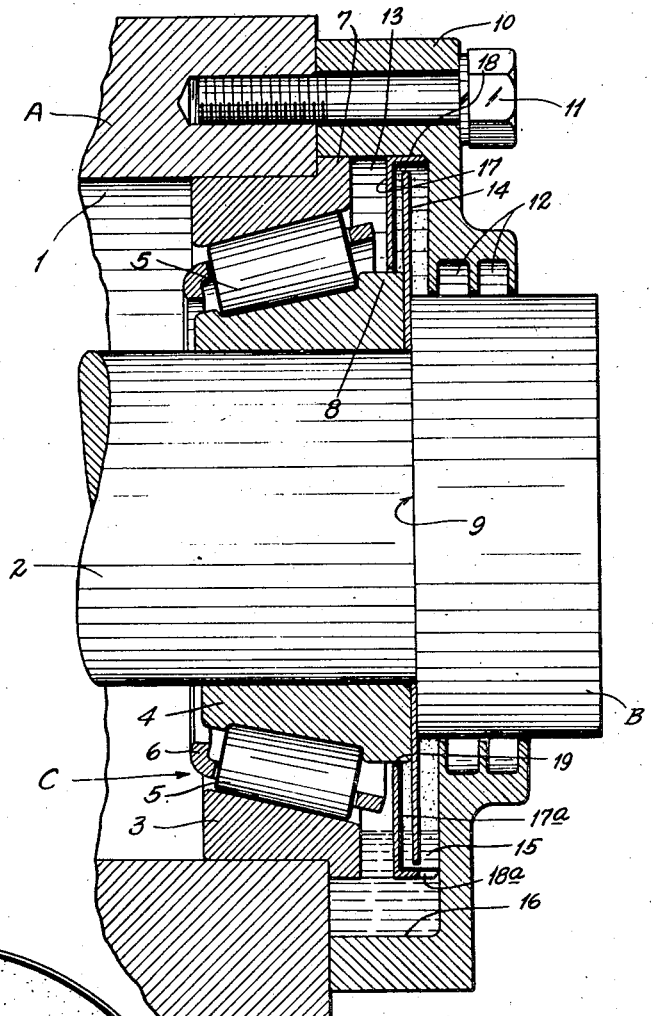
Figure 2:
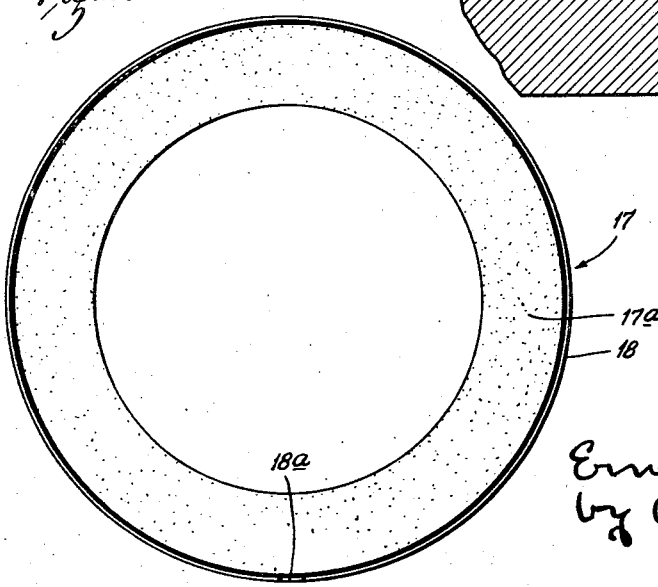

In the accompanying drawing, which forms part of this specification and wherein like symbols refer to like parts wherever they occur, Fig. 1 is a central vertical longitudinal section through a portion of a roller bearing shaft mounting provided with a bearing lubricating means embodying my invention; and Fig. 2 is an end view of the annular lubricant conductor plate looking at the lubricant receiving surface thereof.

In the accompanying drawing, my invention is shown embodied in a roller bearing shaft mounting comprising a stationary housing A with a horizontal opening 1 therethrough and a rotary shaft B having a reduced portion 2 journaled in a rotary antifriction bearing C mounted in said opening. The bearing C preferably comprises a cup or outer raceway member 3 seated in the opening 1 in the housing A, a cone or inner raceway member 4 mounted on the reduced portion 2 of the shaft B for rotation therewith, a series of conical rollers 5 interposed between and cooperating with said cup and said cone and a suitable cage 6 for said rollers. The cup 3 of the taper roller bearing C has an outstanding circumferential flange 7 at the outer end thereof which abuts endwise against the end of the housing A around the opening 1 therein; and the cone 4 of said bearing is mounted on the reduced portion 2 of the rotary shaft B with its large or thrust rib end 8 facing the annular shoulder 9 formed on said shaft by said reduced portion thereof.

The housing A has an annular member 10 closing its bearing receiving end and secured thereto by cap screws 11. The shaft receiving opening in the annular end closure member 10 has suitable sealing grooves 12 therein. The annular end closure member 10 has an inwardly facing annular recess 13 in which are accommodated the outstanding flanges 7 at the outer end of the bearing cup 3 and a bearing lubricating device hereinafter described.

The hereinbefore referred to bearing lubricating device comprises an annular slinger plate 14 which is clamped on the rotary shaft B between the annular shoulder 9 thereon and the thrust rib 8 on the adjacent outer end of the bearing cone 4 and extends radially outwardly thereof into the recess 13 in the inner end of the annular end closure 10 with its lower end portion disposed in a body of lubricant 15 contained in the lower portion of said recess below the adjacent end of the raceway surface of the bearing cup 3. As shown in the drawing, the recess 13 may be enlarged, as at 16, to increase the lubricant containing capacity of the lower portion thereof.

Mounted in the annular end closure 10 around the thrust rib 8 of the bearing cone 4 is a nonrotary annular lubricant distributor or dam 17 which is spaced inwardly of the slinger 14 and has a peripheral flange 18 which is press-fitted in the annular recess 13 in said end closure member and extends across but is clear of the peripheral edge of said slinger. The annular lubricant distributor 17 is held against rotation by the press fit of the peripheral flange 18 thereof in the recess 13 in the end closure 10 which flange abuts against the end wall of said recess and serves to space said distributor inwardly of the slinger 14. The peripheral flange 18 of the distributor plate 17 has an opening 18a therein just above the reservoir 16 to establish communication between the latter and the recess 13. The central opening in the stationary distributor 17 is of slightly larger diameter than the thrust rib 8 of the bearing cone 4 so as to provide an annular lubricant passageway 19 between said opening and rib. The slinger plate opposing surface of the stationary distributor plate 17 has a low surface tension; that is, a surface that is easily wetted by lubricant and operates by capillary attraction to induce a flow thereof over said distributor plate even against the force of gravity. Such a surface may be provided by blotting paper, canvas or other suitable material 17a secured to a metal plate or by making the entire distributor plate of such material. A surface having slightly less ability to attract and conduct lubricant may be provided by applying a phosphate coating to the slinger opposing face of the distributor plate.

The operation of the above described bearing lubricating device is as follows: The lower portion of the stationary conductor plate 17 is disposed at all times in the body of lubricant 15 in the lower portion of the recess 13 and lubricant is conducted by the capillary action of the conductor plate facing material 17a to the lower portion of the annular passageway 19 between the central opening in said conductor plate and the thrust rib 8 of the bearing cone 4. At the same time, lubricant is picked up by the rotating slinger plate 14 from the pool or body of lubricant 15 and is thrown by the centrifugal action of said slinger plate outwardly against the portion of the circumferential distributor plate flange 18 located above said body of lubricant where it is attracted and absorbed by the low tension material 17a of the stationary distributor plate 17 and is conveyed by the wicking action of such material to the annular passageway 19 between the central opening in said distributor plate and the thrust rib 8 of the bearing cone 4. Upon reaching the annular passageway 19, the lubricant flows therethrough over the roller thrust rib 8 of the bearing cone 4 and thence along the raceway surface of said cone to the opposite ends of the bearing rollers 5 cooperating therewith. This flow of lubricant around the thrust rib 8 of the bearing cone 4 and over the raceway surface thereof is encouraged and assisted by the natural flow of air currents within the bearing which tend to create a vacuum in the area of contact between the rollers 5 and said thrust rib due to the outward and axial air flow being deflected by the distributor plate 17.

The above described arrangement provides a relatively slow but positive feed of the lubricant to the shaft bearing and thus prevents overheating and reduced efficiency thereof due to excessive lubrication. The greater part of the lubricant is delivered to the roller engaging face of the cone rib 8 where the highest temperatures are generated and this heat is conducted to the housing A by the rollers throwing off the hot lubricant, and also by the slinger plate 14 to the body of lubricant and thence dissipated to the surrounding air through said housing A and the end closure plate 10 therefor. By providing the lubricant conductor plate 17 with a surface having the proper capillary action, the flow of lubricant may be regulated to obtain the desired operating bearing temperatures for certain speed and load conditions. By the use of a surfacing material having a relatively low capacity to attract and conduct lubricant, the quantity of lubricant fed to the bearing may be materially reduced and this small quantity of lubricant easily transformed into a mist when picked up by the air currents created by the above method of lubrication. This system of lubrication can be applied to any form of antifriction bearing.

What I claim is:

1. The combination with a housing having a lubricant reservoir in the lower portion thereof, a rotary horizontal shaft above said reservoir and an antifriction bearing for said shaft, of a lubricating device for said bearing comprising a centrifugal slinger element rotatable with said shaft and through the reservoir therebelow adjacent to one end of said bearing, and a non-rotary capillary distributor element having a surface that is easily wetted by lubricant interposed between said centrifugal slinger element and said end of said bearing and having an outer peripheral portion in position to receive lubricant from said centrifugal slinger element and an inner peripheral portion in position to deliver such lubricant to said end of said bearing.

2. The combination with a housing having a lubricant reservoir in the lower portion thereof, a rotary horizontal shaft above said reservoir and an antifriction bearing for said shaft, of a lubricating device for said bearing comprising a centrifugal slinger member rotatable with said shaft and through the reservoir therebelow adjacent to one end of said bearing, and an annular capillary distributor member having a surface easily wetted by lubricant interposed between said centrifugal slinger element and said end of said bearing and having an outer peripheral portion fixed to said housing in position to receive lubricant from said centrifugal slinger element and an inner peripheral portion disposed in close proximity to said end of said bearing.

3. The combination with a housing having a lubricant reservoir in the lower portion thereof, a rotary horizontal shaft above said reservoir and a rotary antifriction bearing for said shaft, of a lubricating device for said bearing comprising a centrifugal slinger element rotatable with said shaft and through the reservoir therebelow, a distributor element rigid with said housing and disposed alongside said slinger in spaced relation thereto, said distributor element having a portion disposed in spaced overlapping relation to the peripheral edge of said slinger element and a portion disposed closely adjacent to said bearing, and a layer of capillary material bonded to the slinger opposing face of said distributor element.

4. The combination with a housing having a lubricant reservoir in the lower portion thereof, a rotary horizontal shaft above said reservoir and a rotary antifriction bearing for said shaft, of a lubricating device for said bearing enclosed within said housing, said device comprising an annular centrifugal slinger element rigid with said shaft adjacent to one end of said bearing for rotation with said shaft and through the reservoir therebelow, and a fixed annular capillary distributor element having a surface easily wetted by lubricant interposed between said slinger element and said end of said bearing with its lower portion disposed in said reservoir, said distributor element having an outer peripheral portion surrounding the peripheral edge of said centrifugal slinger element and an inner peripheral portion surrounding said end of said bearing closely adjacent thereto.

5. The combination with a housing having a lubricant reservoir in the lower portion thereof, a rotary horizontal shaft above said reservoir and a rotary antifriction bearing for said shaft including a raceway member mounted on said shaft and rollers interposed between the latter and said housing, of a lubricating device for said bearing enclosed in said housing, said device comprising a centrifugal slinger plate rotatable with said shaft and through the reservoir therebelow, and a capillary distributor plate fixed to said housing alongside but clear of said slinger plate, said distributor plate having a peripheral flange disposed in closely spaced overlapping relation to the outer peripheral edge of said slinger plate and a central opening surrounding said end of said raceway member and forming therewith an annular passageway for lubricant from the edge of said central opening.

6. The combination with a housing having a lubricant reservoir in the lower portion thereof, a rotary horizontal shaft above said reservoir and a rotary antifriction bearing for said shaft including a raceway member mounted on said shaft and having a thrust rib, and rollers interposed between said raceway member and said housing in endwise abutting relation to said thrust rib, of a lubricating device for said bearing enclosed in said housing, said device comprising a centrifugal slinger plate rotatable with said shaft and through the reservoir therebelow, and a capillary distributor plate fixed to said housing alongside but clear of said slinger plate with its lower portion disposed in said reservoir, said distributor plate having a peripheral flange disposed in closely spaced overlapping relation to the outer peripheral edge of said slinger plate and a central opening surrounding said rib of said raceway member and forming with said rib an annular restricted passageway for lubricant from the edge of said central opening.

7. The combination with a housing having a lubricant reservoir in the lower portion thereof, a rotary horizontal shaft above said reservoir and a rotary antifriction bearing for said shaft including a raceway member mounted on said shaft and having a thrust rib, and rollers interposed between said raceway member and said housing in endwise abutting relation to said thrust rib, of a lubricating device for said bearing enclosed in said housing, said device comprising a centrifugal slinger plate rotatable with said shaft and through the reservoir therebelow, a distributor plate fixed to said housing alongside but clear of said slinger plate, said distributor plate having a peripheral flange disposed in spaced overlapping relation to the outer peripheral edge of said slinger plate and a central opening surrounding said rib of said raceway member and forming therewith an annular passageway for lubricant, and a layer of capillary material covering the slinger opposing side of said distributor plate.

8. The combination with a housing, a rotary horizontal shaft, a rotary antifriction bearing for said shaft including a raceway member mounted on said shaft and having a thrust rib, and rollers interposed between the latter and said housing in endwise abutting relation to said thrust rib and an annular end closure for said housing cooperating therewith to provide an annular chamber around said shaft opposite said thrust rib and a lubricant reservoir below the latter, of a lubricating device for said bearing enclosed in said annular chamber, said device comprising a centrifugal slinger plate rotatable with said shaft in said annular chamber and through the reservoir portion thereof, and a fixed capillary distributor plate located in said annular chamber alongside but clear of said slinger plate, said distributor plate having a peripheral flange press fitted in said annular chamber in spaced overlapping relation to the outer peripheral edge of said slinger plate and a central opening surrounding said rib of said raceway member and forming therewith an annular passageway for lubricant from the edge of said central opening.

ERNEST G. BODEN.

REFERENCES CITED

The following references are of record in the file of this patent:

UNITED STATES PATENTS

| Number | Name | Date |
|---|---|---|
| 1,053,740 | McReynolds | Feb. 18, 1913 |
| 1,667,807 | Johnson | May 1, 1928 |
| 1,865,088 | Daun et al. | June 28, 1932 |
| 2,000,581 | Coffin | May 7, 1935 |
| 2,010,896 | Richard | Aug. 13, 1935 |
| 2,271,820 | Hamilton | Feb. 3, 1942 |

FOREIGN PATENTS

| Number | Country | Date |
|---|---|---|
| 321,997 | Great Britain | Nov. 28, 1929 |